Patented Apr. 20, 1954

2,676,160

UNITED STATES PATENT OFFICE 2,676,160

ERASER

Alfonso A. Ochoa, Guadalajara, Jalisco, Mexico

No Drawing. Application May 4, 1951,
Serial No. 224,682

1 Claim. (Cl. 260—30.6)

This invention relates to an eraser of the art gum type. Soft erasers and cleaning compounds known as art gum have heretofore been made from vulcanized oils. For example one formulation comprises the reaction product of sulfur chloride and corn oil with the addition of abrasives.

It is an object of this invention to provide an improved art gum type eraser and cleaning compound. A further object is to provide an eraser from a vinyl resin. A particular object is to provide a simple means of making an art gum type eraser avoiding reaction of sulfur chloride. A still further object is to provide an improved method of cleaning paper.

In accordance with this invention it has been discovered that a superior eraser and cleaning compound of the art gum type can be prepared directly from polyvinyl chloride by the incorporation of a high proportion of a certain combination of plasticizers. The primary plasticizer is a phthalate ester, preferably dioctyl phthalate, and comprises at least 140 parts by weight per 100 parts by weight of polyvinyl chloride. An auxiliary plasticizer comprises an ester of an aliphatic dicarboxylic acid as for example dioctyl azelate. The total plasticizer should be within the range of 175–200 parts per 100 of polyvinyl chloride. Paper and especially the surfaces of drawings can be cleaned with remarkable facility by lightly abrading the surface thereof with the composition.

Mixed alkyl aryl phosphates in combination with phthalate esters significantly increase resistance to embrittlement and may advantageously replace part of the phthalate. Finally the addition of stabilizers is advantageous.

A typical formulation illustrating the invention but which is not to be taken as limitative thereof is as follows:

| | Parts by Weight |
|---|---|
| Polyvinyl chloride | 1,000 |
| Di-2-ethyl hexyl phthalate | 1,400 |
| 2-ethyl hexyl diphenyl phosphate | 300 |
| Di-octyl azelate | 200 |
| Stabilizers | 30 |

A variety of stabilizers are available under trade names. Most of these stabilizers are metal salts, examples of which are Ferro 221, the commercial name for cadmium ricinoleate, dibasic lead stearate, basic lead acetate, lead naphthenate, cadmium caproate, dibutyl tin maleate, phenyl salicylate and dibasic lead phosphate. While desirable the phosphate plasticizer is not essential but if omitted the proportion of dioctyl phthalate should be increased.

The performance of the composition described above was compared to art gum by competent draftsmen who found it to be a superior cleaning agent and eraser. The efficiency may be still further improved by the addition of abrasives. For example the addition of 32 parts light magnesium oxide and 310 parts of 200-mesh pumice to the aforementioned formulation provides an even more efficient cleaning agent for paper when the surface thereof is lightly abraded. In general, abrasives in amounts within the range of 25–50 parts per 100 of polyvinyl chloride are advantageous.

What is claimed is:

An eraser of the art gum type comprising

| | Parts by Weight |
|---|---|
| Polyvinyl chloride | 1,000 |
| Dioctyl phthalate | 1,400 |
| Octyl diphenyl phosphate | 300 |
| Dioctyl azelate | 200 |
| Stabilizers | 30 |

References Cited in the file of this patent

UNITED STATES PATENTS

| Number | Name | Date |
|---|---|---|
| 2,090,708 | Stahl | Aug. 24, 1937 |
| 2,325,951 | Gresham | Aug. 3, 1943 |
| 2,528,506 | Foye | Nov. 7, 1950 |

FOREIGN PATENTS

| Number | Country | Date |
|---|---|---|
| 590,831 | Great Britain | July 30, 1947 |
| 632,758 | Great Britain | Dec. 5, 1949 |